(12) United States Patent
Tanner et al.

(10) Patent No.: US 9,262,489 B2
(45) Date of Patent: Feb. 16, 2016

(54) REPOSITORY-BASED ENTERPRISE SEARCH WITH USER CUSTOMIZATIONS

(71) Applicant: Cisco Technology, Inc., San Jose, CA (US)

(72) Inventors: David A. Tanner, Saratoga, CA (US); Anna Gibson, Mountain View, CA (US); Ashley Church, San Jose, CA (US); Samuel Craig Johnson, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 165 days.

(21) Appl. No.: 13/947,586

(22) Filed: Jul. 22, 2013

(65) Prior Publication Data

US 2015/0026171 A1    Jan. 22, 2015

(51) Int. Cl.
*G06F 17/30* (2006.01)

(52) U.S. Cl.
CPC ............................... *G06F 17/30554* (2013.01)

(58) Field of Classification Search
USPC .......................... 707/705, 728, 636; 715/168
See application file for complete search history.

(56) References Cited

U.S. PATENT DOCUMENTS

| 7,181,438 | B1* | 2/2007 | Szabo |
| 7,953,731 | B2 | 5/2011 | Patel et al. |
| 2006/0020587 | A1 | 1/2006 | Kausik |
| 2006/0064313 | A1* | 3/2006 | Steinbarth et al. ................ 705/1 |
| 2006/0271520 | A1* | 11/2006 | Ragan ................................ 707/3 |
| 2009/0119280 | A1* | 5/2009 | Waters et al. ..................... 707/5 |
| 2012/0030240 | A1* | 2/2012 | Engelhardt ....... G06F 17/30289 707/778 |
| 2012/0078869 | A1* | 3/2012 | Bellville et al. .............. 707/706 |
| 2012/0158719 | A1 | 6/2012 | Gannu et al. |
| 2012/0310926 | A1 | 12/2012 | Gannu et al. |
| 2013/0018967 | A1 | 1/2013 | Gannu et al. |
| 2013/0246432 | A1* | 9/2013 | Paskin et al. .................. 707/740 |

* cited by examiner

*Primary Examiner* — Hung T Vy

(74) *Attorney, Agent, or Firm* — Parker Ibrahim & Berg LLC; James M. Behmke; Stephen D. LeBarron

(57) ABSTRACT

In one embodiment, a search string is received from a user and the search type of the search is determined from the search string. Based on the search type, an order of repositories to search is determined and each repository is searched. The search results from each repository are displayed for the user in separate panels for each repository and the panels are ordered based on search type and the search results within each panel are ordered using that respective repository's relevancy.

19 Claims, 8 Drawing Sheets

REPOSITORY-BASED ENTERPRISE SEARCH WITH USER CUSTOMIZATIONS

TECHNICAL FIELD

The present disclosure relates generally to searching a computer system, and, more particularly, to searching a group of repositories based on the intent of the search.

BACKGROUND

The Enterprise search space presents a different search challenge than the Consumer search space because an Enterprise may include multiple different databases and systems for different organizations within a company. Current enterprise and consumer search solutions attempt to hide the repositories of data being searched and presented. To the contrary, huge benefits can be realized by focusing on the repositories with intelligent processing. Additionally, many users feel as if they have no control over the results for their specific needs. That is, engineers feel that too many results are weighted towards sales, or when searching for an IT tool they find too many IT presentations instead of the actual tool, or when their daily tasks change they have no way to adjust the relevancy. The growing use of the cloud will add to the problem.

In a consumer searching system, multiple different sources or repositories are searched. Generally, the results returned to a user from a search are a blended list of single-line results, which can include new sources, discussion groups, documents, etc. Some consumer searching systems provide containers for different types of data through the use of tabs, such as a web tab, an images tab, a maps tab, etc. However, the ordering of the tabs is static and generally includes multiple different pages. The result is that is makes it difficult for the user to maintain mental continuity when scanning results. It also takes longer to isolate the set of desired results to view as users in the enterprise do think in terms of data repositories.

Searching systems that search based on role, community and/or organizational relevancy can improve relevancy of search results within an enterprise system. However, for a role based system, each job titles would need a separate algorithm, and in a large company the number of different job title may be extremely burdensome. Additionally, when a user is looking for a tool that is not within their field or role, then a search based on their role may not be within the search results or buried on the second or third page of results. Most users don't look beyond the first page of search results.

Other search engines allows a user to search a device based on searching multiple different types of data such as documents, folders, images, contacts, etc. separately. The search results are returned in a list sorted by a simple static ordering which includes a various types of data. The static ordering does not order the types of data based on relevancy for the user. However, each type of data is searched based the same criteria. The order of different types of data searched is the same for all searches and set by the search engine. The user can completely override the search engine's ordering and/or delete types of data searched, but only in regard to one specific device at a time and changing the list of types of data searched is very cumbersome.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a search string is received from a user and the search type of the search may be determined from the search string. Based on the search type, an order of repositories to search is determined and each repository is searched. The search results from each repository are displayed for the user in separate panels for each repository and the panels are ordered based on search type and the search results within each panel are ordered using that respective repository's relevancy.

Description

A searching system and method that receives a search string and determines a search type or intent from the search string. From the search type an order of repositories is determined. Each repository is then searched. The searching of each repository may be done individually and/or in a group. The searching within each repository is based on relevancy with the search string. One or more repositories may use a different algorithm for searching within their repository. The search results are displayed for the user in repository panels with the order of the repository panels from determined search type. The arrangement of search results within each repository panel may be organized by respective native searching algorithm or the inter-repository processing. The order of repositories is displayed with the repository panels to allow for easy user customization.

An enterprise system stores internal and external information across an entire organization, for example including documents, tools, application, etc. for finance/accounting, manufacturing, sales and service, customer relationship management, human resources (HR), engineering, and/or information. Additionally, the enterprise system may also include maintaining data for internal and/or external websites. Within the enterprise system each organization or business unit may have its own database or repository, for example the sales department may have its own database of presentations and tools. Also, the enterprise system may include divisions of data may be formed based on security level. For example, an engineering document may be within engineering secured database, where a user may be able to search for the document but cannot open the document without proper access.

In many enterprise systems, when a user wants to find an object, for example a document or a tool, generally the user must search each repository sequentially. However, the user may not know the best repository. If the search is performed of all the repositories, then the search algorithm may not be specific for each repository and return poor results. Also, the search results from all the repositories may be cumbersome because the user does not know what part of the enterprise system or external system that results are located.

Figure 1A:
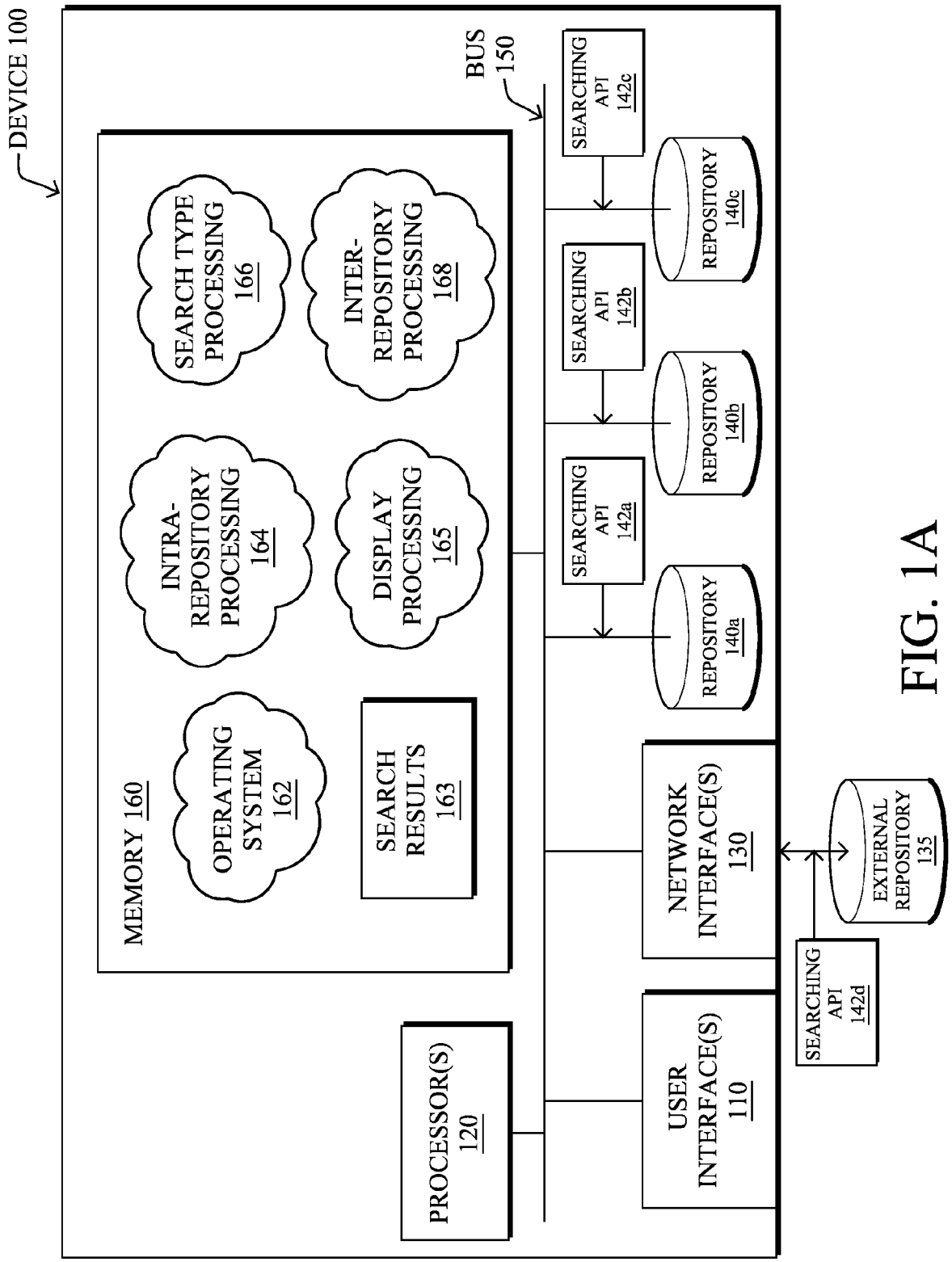
FIG. 1A illustrates an example device.

FIG. 1A is a schematic block diagram of an example device 100 that may be used with one or more embodiments described herein. The device 100 may comprise one or more network interfaces 130 (e.g., wired, wireless, etc.), at least one processor 120, and a memory 160 interconnected by a system bus 150, a user interface 110, as well as a plurality of repositories 140a-140c. Each repository may include one or more databases, web systems, directories, social media servers, servers, and/or cloud systems.

The network interface(s) 130 contain the mechanical, electrical, and signaling circuitry for communicating data from one or more external repositories 135. The network interfaces may be configured to transmit and/or receive data using a variety of different communication protocols.

The memory 160 comprises a plurality of storage locations that are addressable by the processor 120 for storing software programs and data structures associated with the embodiments described herein. The processor 120 may comprise hardware elements or hardware logic adapted to execute the software programs and manipulate the data structures (search results) 163. An operating system 162, portions of which are typically resident in memory 160 and executed by the processor, functionally organizes the device by, inter alia, invoking operations in support of software processes and/or services executing on the device. These software processes and/or services may comprise search type processing 166, intra-repository processing 164, inter-repository processing 168, and display processing 165, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Search type processing 166 contains computer executable instructions executed by the processor 120 to perform functions provided by one or more algorithms for determining a search type from a search string. Intra-repository processing 164 contains computer executable instructions executed by the processor 120 to perform functions provided by one or more algorithms for determining an order of repositories based on most relevant to least relevant to search from a plurality of the repositories 140a-140c, 135 and display to the user in that determined order.

The Inter-repository processing 168 contains computer executable instructions executed by the processor 120 to perform functions provided by one or more searching applications 142a-142d associated with each respective repository 140a-140c, 135.

These applications may, within capable repositories 140a-140c, 135, be configured to search within their own respective repository based on a native searching algorithm and return search results 163 to memory 160. Alternatively, or in combination, the inter-repository processing 168 executed by the processor 120 may search within a repository 140a and return search results 168 to memory 160.

Figure 1B:
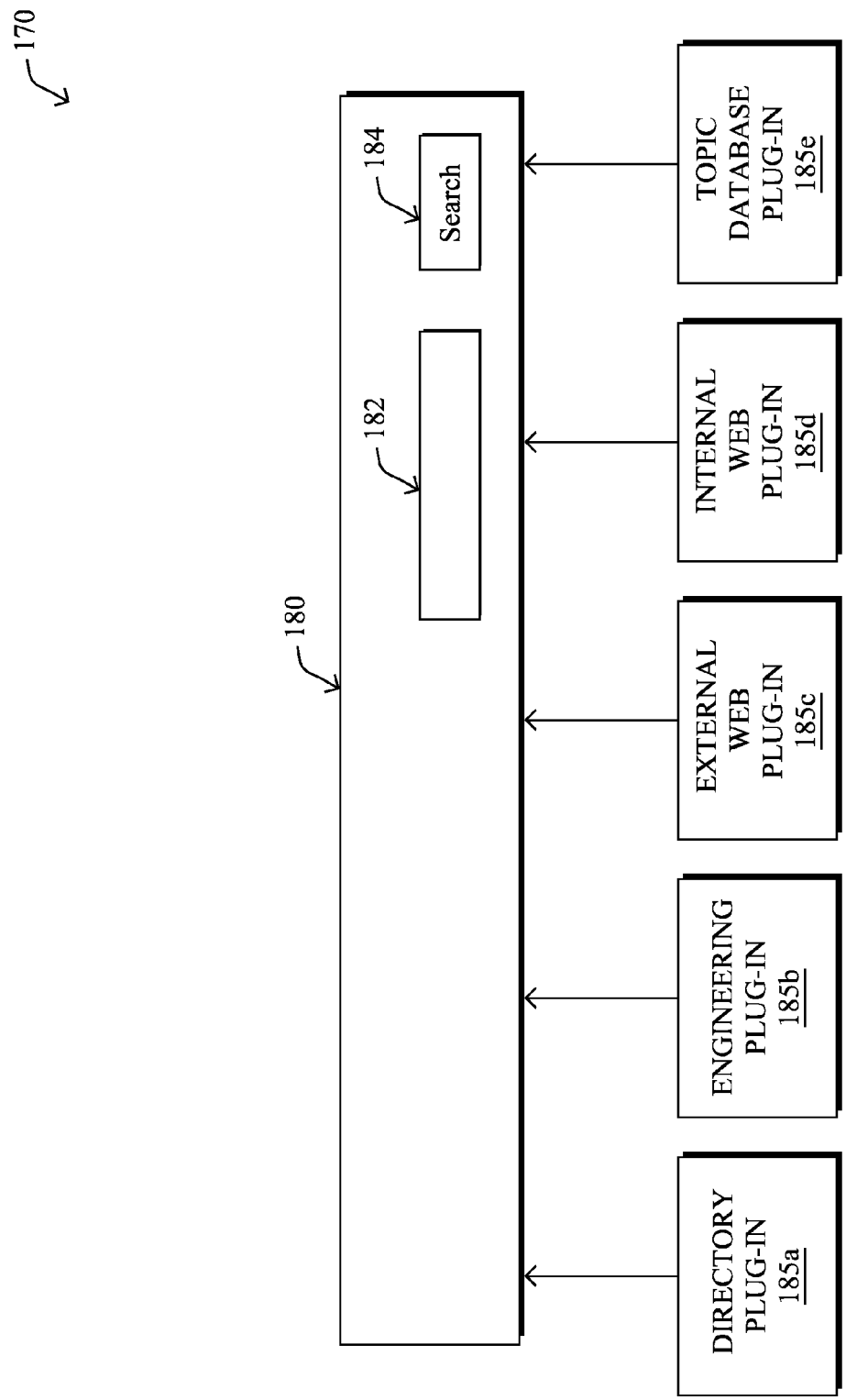
FIG. 1B illustrates an example plug-in architecture.

Alternatively or in combination, the inter-repository processing 168 may be configured using a plug-in architecture (See FIG. 1B). Whereby each plug-in represents a repository and each plug-in is responsible for that repository's interfacing, relevancy algorithm, formatting and display of results, repository based features and results based features.

Display process 165 contains computer executable instructions executed by the processor 120 to generate a display of search results 163 within user interfaces 110. The search results 163 are formatted into repository panels (See FIG. 4) with each repository using its own respective format or a format from the inter-repository processing 168. Additionally, each repository displays results in a way that best matches the needs of the user for that repository and provides repository or result specific value added features.

FIG. 1B illustrates an example plug-in architecture framework 170 that may be used with one or more embodiments described herein. One or more repositories may interact with the intra-repository processing 164 as a plug-in component. Each plug-in component 185a-185e is a separate software application and each plug-in component relates to a separate repository or database that is included in the overall search. The plug-in architecture framework 170 includes a front end user interface 180 and intra-repository relevancy processing 164. The front end user interface 180 includes a box 182 for entering a search string and a button 184 to execute the search. Box 182 and button 184 may be similar to box 405 and button 410 in FIG. 4.

Each plug-in component 185a-185e includes at least a user interface for that specific repository and a relevancy algorithm for that repository. For example, the engineering plug-in includes a user interface for formatting the display of search results within a engineering panel and a relevancy algorithm for searching within the engineering database. Further each plug-in component 185a-185e may also include interfacing with the data repository, inter-repository relevancy algorithm, display characteristics, repository level features such as specialized filtering or sorting functions, and search result level features such as the ability to check out the associated document or query more information. Each plug-in component may include different features in formatting the search results. For example, the engineering plug-in 185b may include a specific function to check out a document from the engineering panel, and a topic database may include a selection method for blended results or categorized results. Each plug-in uses its own features to determine the look and feel of the search results that are in regard to the type of results returned, such as if the search results are for webpages, tools, documents, etc. Other features that may be implemented separately by a plug-in components are length of summaries of results, previews of documents, check-in/checkout, the type of details returned with a search result, for example time stamps, owner, so forth, etc. Additionally, the plug-in framework architecture 170 may include one or more features that are applied globally to all plug-in components.

Figure 2:
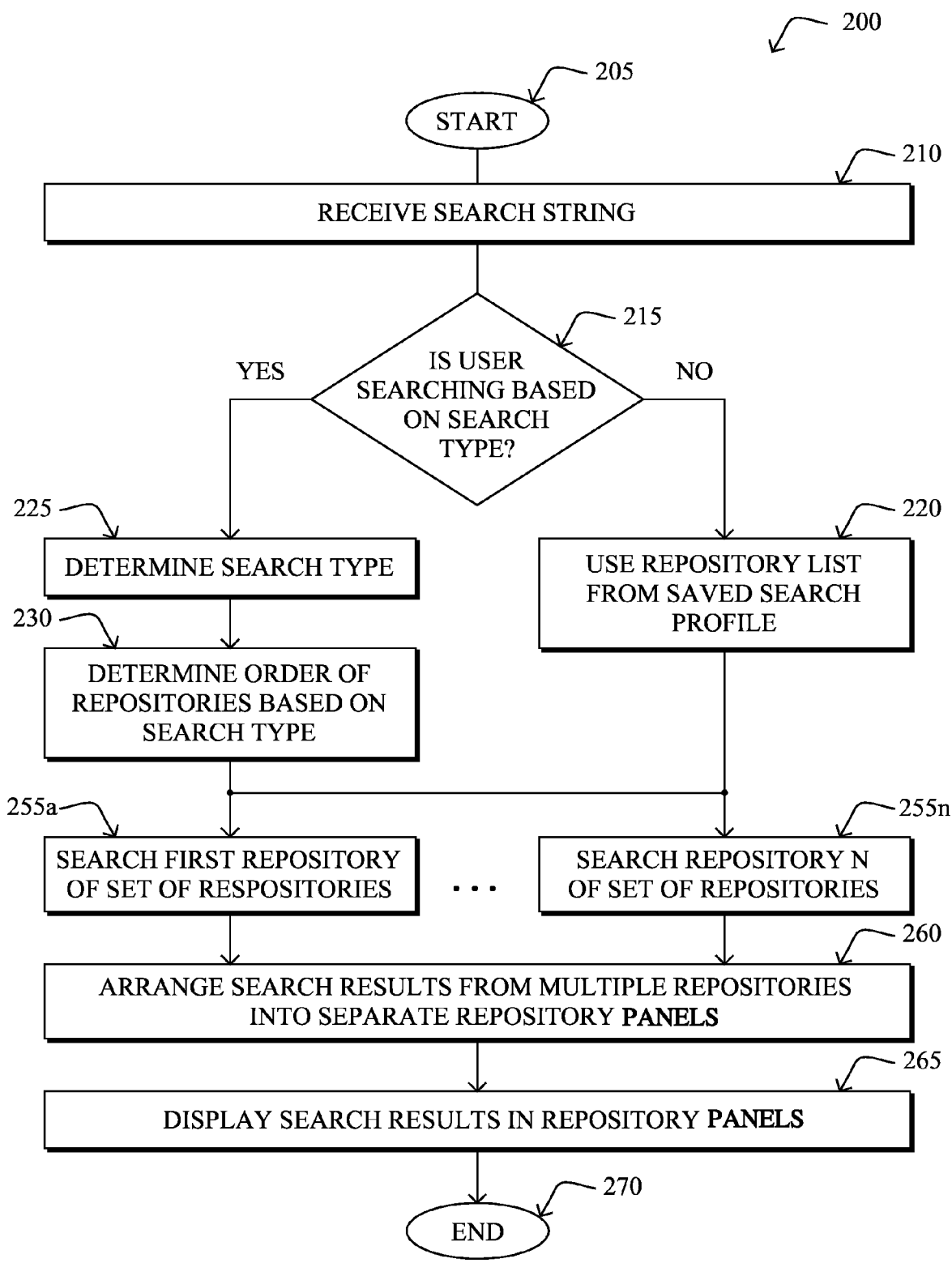
FIG. 2 illustrates an example procedure for searching a plurality of repositories.

FIG. 2 illustrates an example procedure 200 for searching a plurality of repositories in accordance with one or more embodiments described herein. The procedure 200 may start at step 205, and continues to step 210 when device 100 receives a search string from a user. Next, at step 215, the device 100 determines if the user is searching based on search type. If the user is not searching based on search type, then at step 220, then the list of repositories used for searching comes from a user's saved search profile. The save search profile may accessible to the user through any user device, such as a mobile phone or a laptop. If the user is searching based on search type, then at step 225, the device 100 determines the search type or the intent of the search. The search type may be a product, user name, user ID, document number, tool, application, game, book, rule, idea, etc. Then, at step 230, the intra-repository processing 164 determines an order of repositories based on the search type. (For more detail see FIG. 3).

Next at steps 255a-255n each repository from the set of repositories is searched. The searching can be done by each separate repository or device 100 can perform the search within the repository based on the searching logic and/or hardware within the particular repository. The searching criterion for each repository is determined by the native searching application 142a-142d of that repository. In other words, different repositories may apply the same search term in different ways by applying different weights to the results based on for example the user's role, organization, number of times a pages repeats, location within a document, etc. Alternatively, if device 100 is performing the search, then the search criteria may be a general search applied to all repositories 140a-140c searched or may be a unique search for each repository 140a based on information about users of that repositories, date of documents, and/or items within that repository.

The memory 160 executed by the processor 120 receives and/or retrieves the search results 163 from each repository of the set of repositories. Then at step 260, the search results 163 are arranged into separate panels with one panel for each repository. The format of each panel is arranged based on the respective native searching algorithm and/or the inter-repository processing 168. Then the procedure 200 ends at step 270 after the search results 265 are displayed to the user in repository panels 420, 440, 460 (See FIG. 4). Each repository panel may have a different format resulting in a different intrinsic look and feel for the user in each panel.

Figure 3:
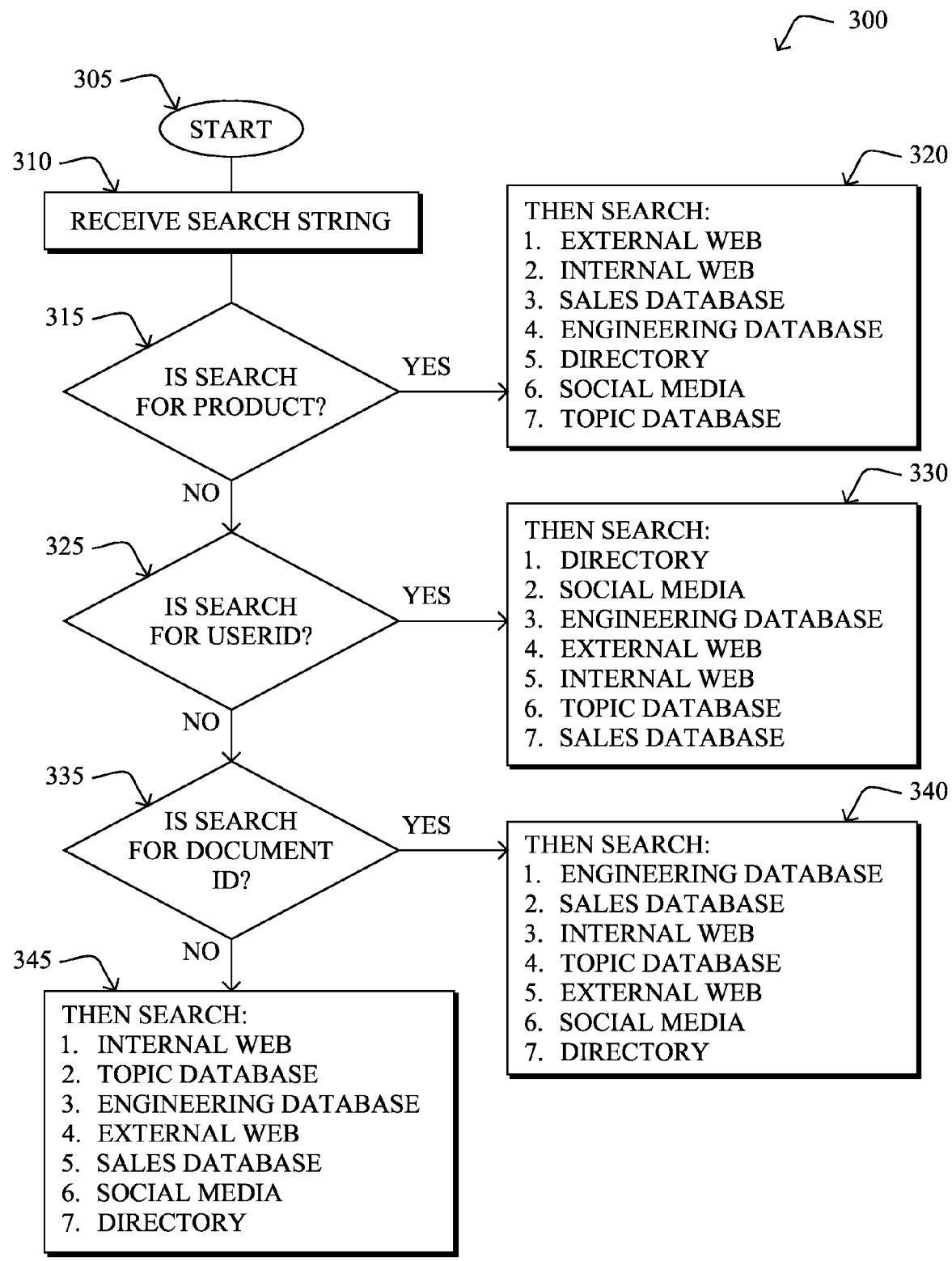
FIG. 3 illustrates an example simplified procedure for determining an order of repositories.

FIG. 3 illustrates an example procedure 300 for determining the search type of a search string in accordance with one or more embodiments described herein. The search type may also be equivalent to the intent of the search. For example if the user entered a document ID, then the user is most likely looking for a document or if the user entered a product name, then the user is most likely looking for information about a product. The procedure 300 may start at step 305, and continues to step 310 when device 100 receives a search string.

Then at step 315, the search type processing 166 executed by processor 120 determines if the search is for a product. If the search is for a product, then at step 320, a first order of repositories are selected. For example, this first order of repositories may include an external web repository, an internal web repository, a sales database, an engineering database, a directory, social media database, and a topic database. If the search is not for a product, then at step 325, the search type processing 166 executed by processor 120 determines if the search is for a user ID. If yes the search is for a user ID, then at step 330 a second order of repositories are selected. For example, the second order of repositories may include a directory repository, a social media repository, the engineering repository, external web repository, internal web repository, topic database, and sales database. If the search is not for a user ID, then at step 335, then the search type processing 166 determines if the search is for a document number. If yes the search is for a document number, then at step 340, a third order of repositories is searched. For example, the third order of repositories may include the engineering database, sales database, internal web, topic database, external web repository, social media repository, and a directory. If the search is not for a document number, then at step 345, the fourth order of repositories are selected. The fourth order of repositories may include the internal web repository, topic database, the engineering database, external web repository, sales database, social media, and directory. A person skilled in the art would recognize that more or less search types may be determined and thus more or less orders of repositories are possible. Additionally, the use of product, user ID, and document number are used as examples of search types, but many other search types are possible. Alternatively, or in combination the search type may also restrict which repositories are selected to be searched.

It should be noted that while certain steps within procedures 200-300 may be optional as described above, the steps shown in FIGS. 2-3 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 200-300 are described separately, certain steps from each procedure may be incorporated into each other procedure, and the procedures are not meant to be mutually exclusive.

Figure 4:
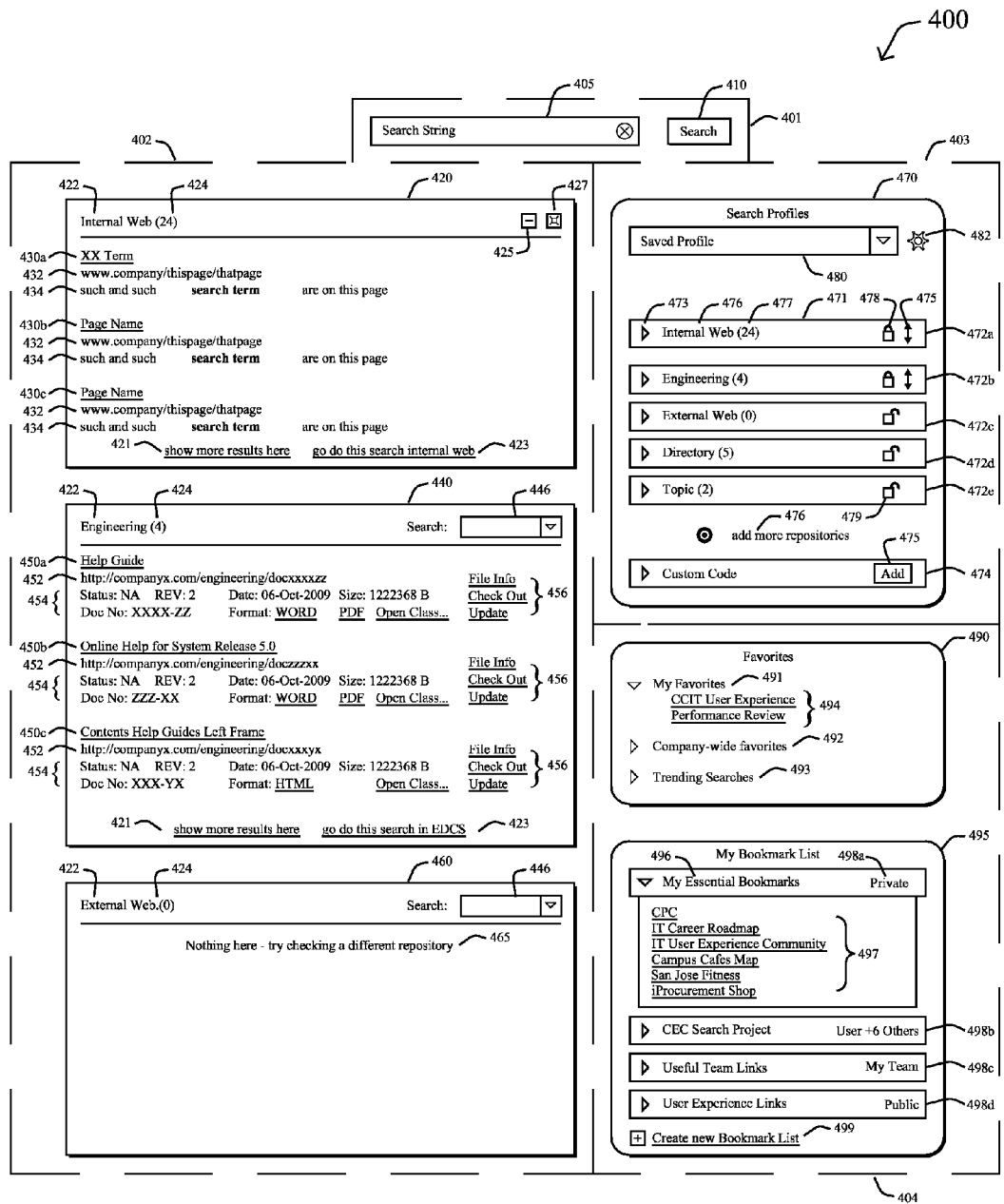
FIG. 4 illustrates an example user interface for displaying search results.

FIG. 4 illustrates an example user interface 400 that may be used with one or more embodiments described herein. The user interface 400 may include four sections: a searching section 401, repository display section 402, a search profile section 403, and a favorites and/or bookmark section 404. The sections 401-404 may all be displayed on user interface or one or more can be displayed based on the information that needs to be entered or displayed.

The searching section 401 includes a search box 405 for a user to enter a search string. The search string is sent through user interface 110 to memory 160 when a user selects button 410. Prior to receiving search results, the searching section 401 may be the only part of user interface 400 displayed to the user.

Repository section 402 includes one or more repository panels 420, 440, 460 based on the number of repositories in the set of repositories, number of results returned in each repository, and relative size of screen and font. In some instances the repository section 402 may include every repository and in other cases only a subset of repositories may be viewed from the ordered list of repositories.

Generally, the repository panels 420, 440, 460 are ordered based on the search type or a saved search profile. The information and arrangement of search results within each repository may be related to the native search application of the respective repository or from the display interface processing or some combination of both the respective repository processing and the display interface processing 165 or the inter-repository processing 168.

Repository panel 420 shows an example panel of an internal web repository. Repository panel includes a name of repository 422, for example Internal Web, and the number of results 424 found, for example in this case is 24 results were found. By selecting the name of the repository 422, the user can be taken directly to that repository and in this case the internal web repository. The search results shown in repository panel 420 for example include a page name 430a-430c, an address location of the page 432, and a summary 434 of where the search term appears on the page. The page name 430a-430c and/or the address location 432 may include a link directly to the appropriate web page. The number of results shown in each repository may be set by the user (see FIG. 5), set by the native searching application, and/or set by the inter-repository processing.

Repository panel 420 may include links to show more results 421 and a link to perform a new search in only in the internal web repository 423. Also, panel 420 may include a minimization button 425 to minimize panel 420 within the repository section 402, and a maximization button to maximize panel 420 within repository section 402.

Repository panel 440 is another example of a repository panel with a different arrangement of search results. The search results may include a document name 450a-450c, an address location of the file 452, information about the file 454, and additional options 456. The document name 450a-450c and/or the address location 452 may include a link to take the user directly to the file. The information about the file 454 may include document number, status, version, date created, date modified, size, format, creator, last modifier, etc. Other options 456 that may be included are links for file info, to check document out, to update file info, etc. Repository panel 440 may also include a search box 446, where a user can enter the same search string or any other search string to search within the repository named in repository 440 and the search results will be shown within only that repository.

Repository panel 460 shows an example view of a repository when no results are returned. The repository panel 460 may include text 465 stating that no results were found and to check a different repository. Alternatively, text 465 may suggest a repository when the search was limited to a user's search profile and did not include all the repositories for a search type. Alternatively, an empty repository may be listed only within profile section 403 with an indication of no results were found. This may reduce the number of panels shown and less clutter for the user.

The profile section 403 includes a search profile interface 470. The search profile interface 470 includes a pull down list 280 for displaying the user's one or more saved profiles. Link 482, shown for example as a gear, allows the user to setup a saved profile based on the desired ordering of repositories provided to the user.

Figure 5:
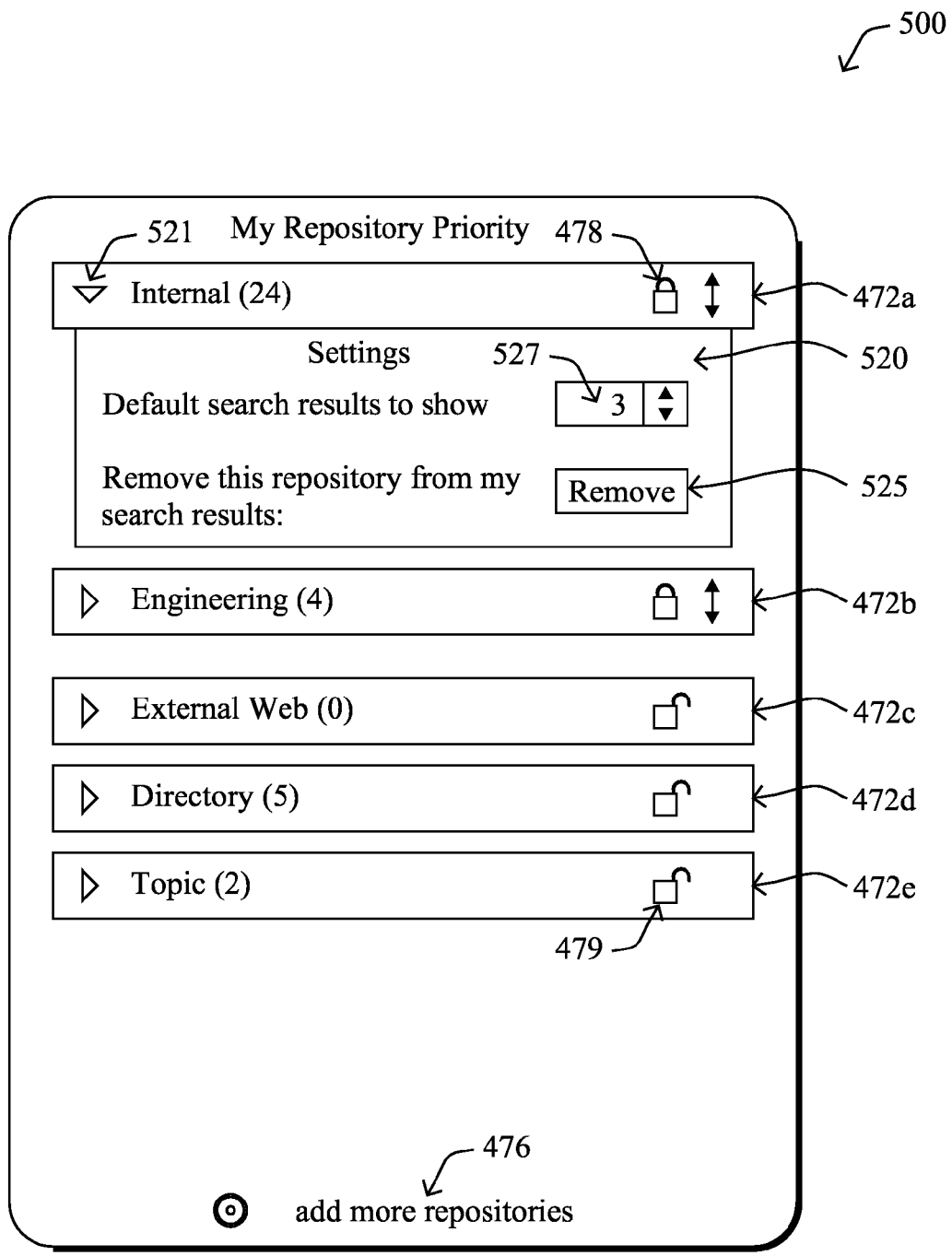
FIG. 5 illustrates an example profile user interface for modifying repository priority and display functions.

The search profile interface 470 further includes a list of repositories 472a-472e, which correlate to the order of repositories displayed to the user. The list of repositories 472a-472e exposes to the user which repositories that were searched, and a ranking order of the repositories. Each repository 472a-47e is displayed in a separate block 471 separating the repositories. Each block 471 includes a link 473 to more options, for example the link is shown as a triangle, and when selected the search profile 470 of FIG. 5 is shown. Block 471 further includes a title of repository 476 and a number of results returned 477. The title of the repository 476 may also include an auto scroll function, which when the user selects the title of the repository 476, the display interface 402 auto scrolls down to that repository.

Each block 471 includes either an unlock button 479 or a lock button 478. The lock button(s) 478 allows a user to modify the display of current returned repository panels and/or future search results by saving the changes to a saved search profile through link 482. Once block 471 is locked, then arrows 475 are displayed and the user can move block 471 up or down relative to the other locked boxes to change the order of the repositories. The order of the repositories changes in the repository display section 402 and/or in the saved search profile.

The profile interface 470 may also include a link 476 to add more repositories. Alternatively or in combination, the profile interface 470 may suggest one or more repositories 474 to add. To add the repository, the user would then just click on an add link 474 and the new repository would then be searched and displayed within the repository section 402.

An additional time element (not shown) may be included in user interface 400. The time element may allow the user to adjust a timeline to determine when search results are received from. This can allow a user to select a time period, before a certain date, and/or after a certain date.

User interface 400 may also include a favorites and/or bookmark section 404. The favorites and/or bookmark section 404 may include a favorites section 490 and/or a bookmark list 495. The favorites section 490 provides a user with a location to store their favorite links 491. The links 494 may be to favorite documents, websites, directory information, etc. Additionally, the favorites section 490 may include company-wide favorites 492 which is a list of the most common saved favorites. Also, the favorites section 490 may include trending searches 493, which may include information about the most common searches over the last day or week. Additionally, the user can access their favorites section when using different devices such as a laptop or mobile device.

The bookmark list section 495 allows a user to save links in a plurality of folders 496. Each folder 496 may be for personal, team, a topic, an activity, etc. When a folder 496 is selected, then one or move saved links 497 are displayed. The links 497 may be to any combination of documents, websites, tools, application, social media sites, etc. The links 497 may relate to internal or external items. The user can then decide to keep the bookmarks private 498a, to a specific list of users 498b, to a team 498c, or public 498d. Link 499 allows a user to add more bookmark lists to bookmark list section 495. Additionally, the user can access their bookmark section when using different devices such as a laptop or mobile device.

FIG. 5 illustrates an example profile interface 500 that may be used with one or more embodiments described herein. When a user selects arrow 473 from profile interface 470 in FIG. 4, then profile interface 500 is displayed to the user. Profile interface 500 provides more options for displaying the repositories in the repository section 402. Menu 520 provides the user with box 527 to allow a user to enter the number of search results shown within that repository panel 420. Alternatively or in combination, box 527 may include a set of arrows for increasing or decreasing the number of search results shown in that repository. Additionally, profile interface provides the user a delete button 525 for a user to delete the repository from the search results shown in the repository section 402. The deletion may be applied to the current shown results and/or a saved search profile.

Figure 6A:
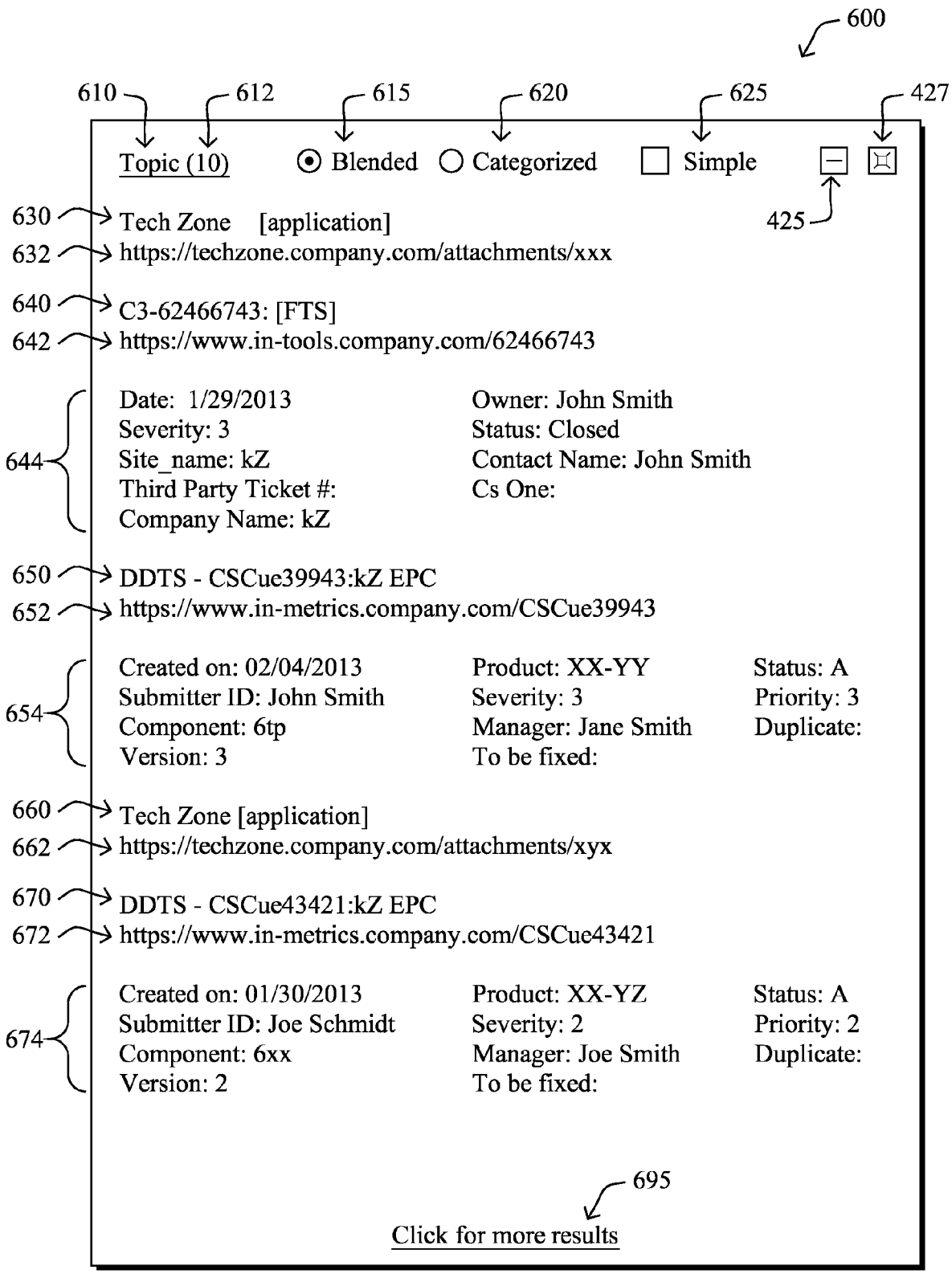
FIGS. 6A-6B illustrate an example repository display panel of blended results.
Figure 6B:
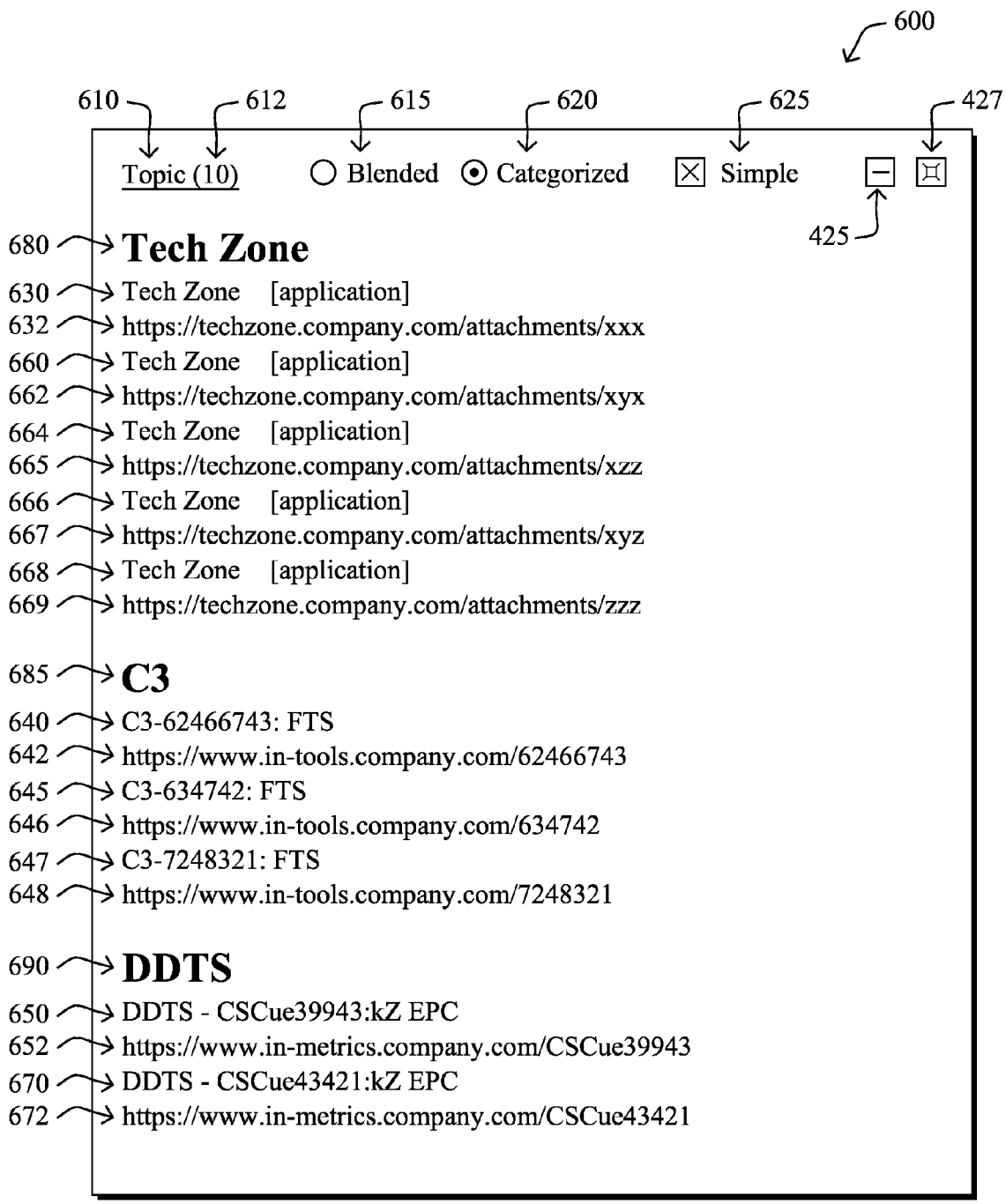

FIGS. 6A and 6B illustrate an example repository panel 600 that may be used with one or more embodiments described herein. FIG. 6A depicts a repository panel 600 with blended search results and FIG. 6B depicts repository panel 600 depicted with categorized results to show that customization may be applied on an individual repository within the multiple different repositories displayed to the user. Further, customized features can be provided at a repository level as well as for the results within the repository. This may be provided by the plug-in associated with that repository.

Repository panel 600 includes a title 610 and number of search results 612. The repository panel may also include a minimization button 425 or maximization button 427. When a repository has multiple different types of search results, for example applications, tools, web pages, documents, etc., then the repository panel 600 may include a link to show in blended mode 615 and a link to show in categorized mode 625.

In regard to FIG. 6A, the link 615 is selected to show the search results in blended mode. Search results 630, 640, 650, 660, 670 are of three different types are ordered based on the search algorithm. The order may be based on most recent, most relevant, etc. In this example, the first search result 630 is an application, and the address location 632 of the application is listed below. Clicking on the search result 630 or the address 632 can take the user directly to the application. The second search result 640 is a tool, and is displayed with the address location 642 and additional information 644. The additional information may include version number, date created, date modified, status, contact name, company name, etc. The third search result 650 is for a document, and is displayed with address location 652 and additional information 654. The additional information 652 may include some of the same information as additional information 644, but also may include different information. The fourth search result 660 is another application and includes an address location 662. The final search result 670 shown is another document and includes an address location 672 and additional information 674. Repository panel 600 may also include a link 695 to show more results if all the results do not fit within repository panel 600.

In regard to FIG. 6B, link 620 is selected to show the search results in categorized mode, and the simple mode is activated with link 625. Repository panel 600 now includes three titles 680, 685, 690, which section each type of result. The order of the categories can be based on the search algorithm or a weight applied to the search results. The simple mode removes the additional information 644, 654, and 674 from the search results.

While there have been shown and described illustrative embodiments that provide for searching an enterprise system and displaying results within repositories, it is to be understood that various other adaptations and modifications may be made within the spirit and scope of the embodiments herein. For example, the embodiments have been shown and described herein with relation to one company's enterprise system. However, the embodiments in their broader sense are not as limited, and may, in fact, be used with any other types of enterprise systems.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving a search string from a user;
receiving a plurality of plug-in components, wherein each plug-in component corresponds to a repository and the plug-in component includes a search algorithm native to for that repository and a user interface specific to that repository;
sending the search to each plug-in component to provide parallel processing of each repository;
determining a search type of the search string;
based on the search type, determining an order of repositories to search;
searching each repository;
receiving search results from each repository, wherein the search results include a separate panel for each plug-in component and the plug-in component formats the search results within that panel; and
displaying search results to the user in separate panels for each repository, wherein the panels are ordered based on search type and search results within each panel are ordered using that respective repository's relevancy.

2. The method as in claim 1, wherein the search type is at least one of a file, a tool, a username, a document name, person's name, a group name, a game, an idea, a statute, a user ID, or a product.

3. The method as in claim 1, wherein, each repository panel includes a user interface from that repository searching algorithm that applies to only search results within that repository.

4. The method as in claim 1, further comprising:
using a search algorithm native to each repository to search within each repository;
sending the search to each repository to provide parallel processing of each repository of the set of repositories; and
receiving search results from each repository.

5. The method as in claim 1, further comprising:
providing a search algorithm for each repository, wherein the search algorithm for each repository is based on characteristics of that repository.

6. The method as in claim 1, further comprising:
providing a profile user interface to allow a user to see the order of repositories that were included within the search, wherein the user can move the relative location of each repository within the profile user interface, and results in a different order of repositories within a display interface.

7. The method as in claim 6, wherein the profile user interface further provides a profile module to allow a user to determine the set of repositories searched and to save that set of repositories for future searches.

8. The method as in claim 1, wherein the repository is at least one of a database, web system, directory, social media, server, or cloud.

9. The method as in claim 1, wherein the search results for a repository includes more than one different type of search results, wherein the display interface allows the user to select between a sorted display or a combined display.

10. The method as in claim 1, further comprising:
receiving a plug-in component of the plurality of plug-in components, wherein the plug-in component includes a repository searching algorithm for a single repository and a user-interface for formatting search results to be displayed within that repositories panel.

11. An apparatus, comprising:
a search user interface configured to receive a search string from a user;
a processor coupled to the user interfaces and adapted to execute one or more processes; and
a memory configured to store a process executable by the processor, the process when executed operable to:
receive a plurality of plug-in components, wherein each plug-in component corresponds to a repository and the plug-in component includes a search algorithm native to for that repository and a user interface specific to that repository;
send the search to each plug-in component to provide parallel processing of each repository;
determine a search type from the search string;
determine an order of repositories to search based on the search type;
searching within each repository using a searching algorithm associated with each repository;

receive search results from each repository, wherein the search results include a separate panel for each plug-in component and the plug-in component formats the search results within that panel; and a display user interface configured to display the search results in repository panels to the user, wherein the repository panels are ordered based on search type and the search results within each panel are sorted based on the searching algorithm associated with that repository.

12. The apparatus as in claim 11, further comprising a profile user interface and is configured to display the order of repositories searched to the user.

13. The apparatus as in claim 12, wherein the profile user interface is further configured to allow the user to move one or more of the repositories displayed to change the ordering of the repositories in the display user interface.

14. The apparatus as in claim 12, wherein the profile user interface is further configured to generate a saved search profile when a user selects one or more repositories and an order of those repositories, wherein when a new search is performed, the set of repositories searched is based on the saved search profile for that user.

15. The apparatus as in claim 12, wherein the profile user interface is further configured to allow the user to delete one or more repositories from the displayed set of repositories in the display user interface.

16. The apparatus as in claim 12, wherein the profile user interface is further configured to allow the user to add one or more repositories.

17. The apparatus as in claim 12, wherein the profile user interface is further configured to allow the user to change the number of results displayed in each separate repository.

18. The apparatus as in claim 12, wherein the display user interface includes different options for connecting a user to an item displayed a repository based on the type of item displayed.

19. A tangible, non-transitory, computer-readable media having software encoded thereon, the software when executed by a processor operable to:

receive a search string from a user;

receive a plurality of plug-in components, wherein each plug-in component corresponds to a repository and the plug-in component includes a search algorithm native to for that repository and a user interface specific to that repository;

send the search to each plug-in component to provide parallel processing of each repository;

determine a search type of the search string;

based on the search type, determine an order of repositories to search;

search each repository;

receive search results from each repository, wherein the search results include a separate panel for each plug-in component and the plug-in component formats the search results within that panel; and display search results to the user in separate panels for each repository, wherein the panels are ordered based on search type and the search results within each panel are sorted based on relevancy.

* * * * *